(12) United States Patent
Wright

(10) Patent No.: US 12,510,357 B2
(45) Date of Patent: Dec. 30, 2025

(54) LASER LEVELING ASSEMBLY

(71) Applicant: Scott Wright, Mc Bain, MI (US)

(72) Inventor: Scott Wright, Mc Bain, MI (US)

( * ) Notice: Subject to any disclaimer, the term of this patent is extended or adjusted under 35 U.S.C. 154(b) by 344 days.

(21) Appl. No.: 18/229,482

(22) Filed: Aug. 2, 2023

(65) Prior Publication Data
US 2025/0044086 A1    Feb. 6, 2025

(51) Int. Cl.
*G01C 15/00* (2006.01)

(52) U.S. Cl.
CPC .................. *G01C 15/004* (2013.01)

(58) Field of Classification Search
CPC .................................................. G01C 15/004
See application file for complete search history.

(56) References Cited

U.S. PATENT DOCUMENTS

| | | | | |
|---|---|---|---|---|
| 5,394,616 A * | 3/1995 | Claxton | ............... | G01C 15/002 33/275 R |
| 6,012,229 A | 1/2000 | Shiao | | |
| 6,133,996 A * | 10/2000 | Plumb | .................. | G01C 15/008 356/138 |
| 6,167,630 B1 * | 1/2001 | Webb | ....................... | B25H 7/00 33/354 |
| 6,839,974 B1 | 1/2005 | Hitchcock | | |
| D505,869 S | 6/2005 | Lin | | |
| 7,073,268 B1 * | 7/2006 | Etter | ....................... | B27B 27/02 33/640 |
| 7,243,431 B2 * | 7/2007 | Godwin | ..................... | B60D 1/36 33/286 |
| 7,359,762 B2 * | 4/2008 | Etter | ...................... | G05B 19/409 83/76.9 |
| 7,530,175 B2 | 5/2009 | Strutt | | |
| 7,802,372 B1 * | 9/2010 | Silberberg | ............... | G01C 9/28 33/DIG. 1 |
| 7,963,044 B1 * | 6/2011 | Bartholomew | .......... | G01C 9/26 33/383 |
| 8,004,664 B2 * | 8/2011 | Etter | ......................... | B25F 5/00 356/139.1 |
| 9,052,191 B1 | 6/2015 | Keate | | |
| 9,933,259 B1 * | 4/2018 | Vargas | ...................... | G01C 9/26 |
| 2001/0049879 A1 | 12/2001 | Moore, Jr. | | |
| 2002/0166249 A1 | 11/2002 | Liao | | |

(Continued)

FOREIGN PATENT DOCUMENTS

| | | | | |
|---|---|---|---|---|
| CN | 120292977 A | * | 7/2025 | |
| EP | 1327854 A1 | * | 7/2003 | ........... G01C 15/008 |
| WO | WO2008076791 | | 6/2008 | |

*Primary Examiner* — Yaritza Guadalupe-Mccall

(57) ABSTRACT

A laser leveling assembly includes a level to indicate level along a variety of planes for a worker. A pair of first laser emitters is integrated into opposing ends of the level to emit a focused beam of light outwardly from the level onto a surface. A pair of clamps is provided which each has a first gripping element and a second gripping element. The first gripping element associated with each of the pair of clamps receives the level for attaching the pair of clamps to the level to receive a support object thereby facilitating the level to be affixed to the support object. A pair of second laser emitters is each integrated into a respective one of the pair of clamps to emit a focused beam of light outwardly from the respective clamp onto the surface for assisting the worker with visually identifying a level mark on the surface.

10 Claims, 10 Drawing Sheets

(56) References Cited

U.S. PATENT DOCUMENTS

| | | | |
|---|---|---|---|
| 2002/0174553 A1 | 11/2002 | Dolezal | |
| 2006/0225293 A1* | 10/2006 | Godwin | B62D 53/08 |
| | | | 33/264 |
| 2016/0349048 A1* | 12/2016 | Rodriguez | G01C 9/28 |
| 2022/0395963 A1* | 12/2022 | Draeger | B25B 5/102 |
| 2025/0044086 A1* | 2/2025 | Wright | G01C 15/004 |

* cited by examiner

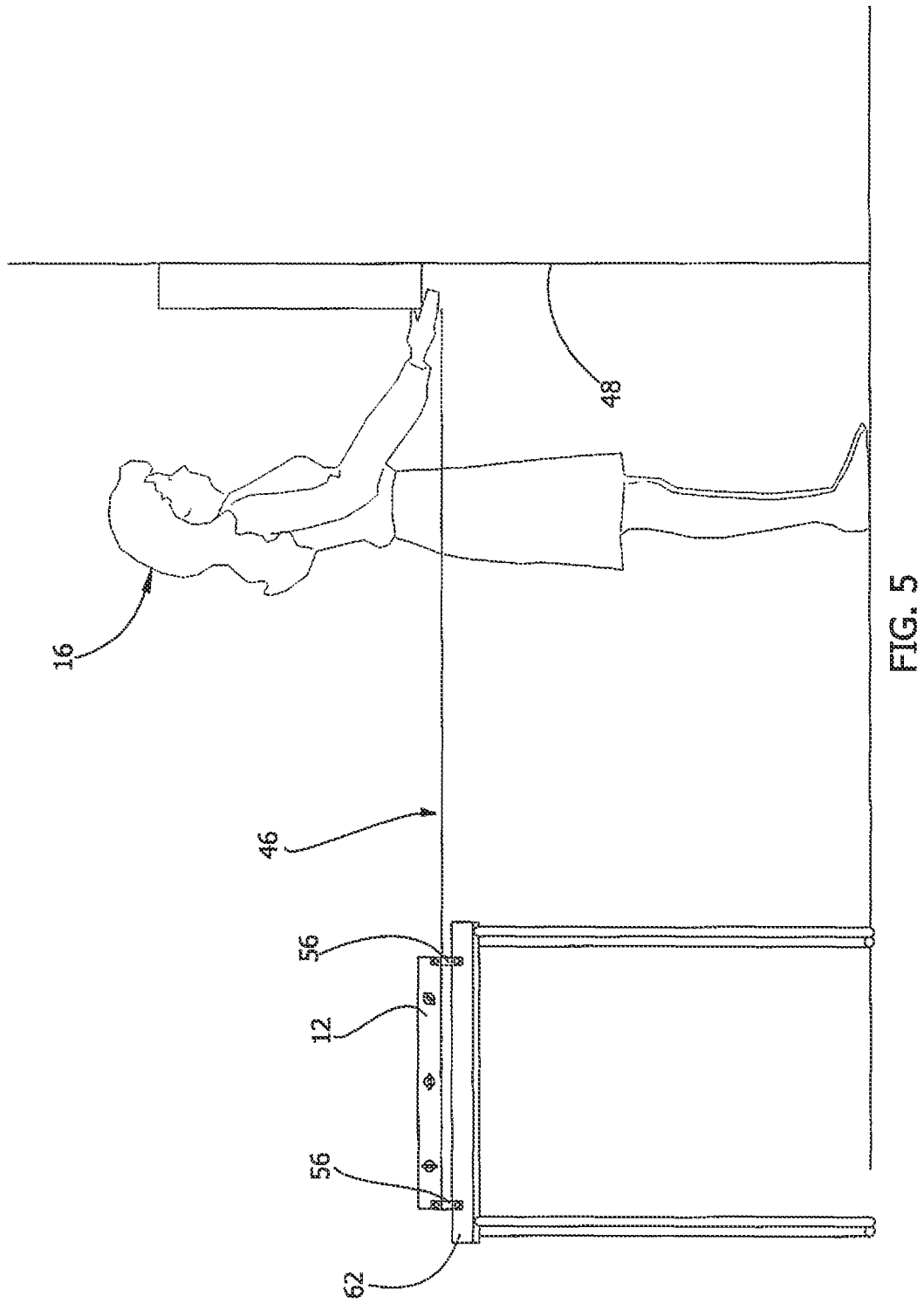

LASER LEVELING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to leveling devices and more particularly pertains to a new leveling device for assisting a worker with projecting a focused beam of light from a bubble level for assisting with leveling objects being installed on a surface. The device includes a bubble level and a pair of first laser emitters integrated into the bubble level for emitting a focused beam of light onto a surface for leveling. The device includes a pair of clamps that can each be attached to the level and which can engage a support object for mounting the level to the support object. The device includes a pair of second laser emitters each integrated into a respective clamp for emitting a focused beam of light onto the surface for leveling.

(2) Description of Related Art Including Information Disclosed Under 37 CFR 1.97 and 1.98

The prior art relates to leveling devices including a variety of bubble level devices that each has a laser light emitter for emitting a focused beam of light onto a surface for leveling an object. In no instance does the prior art disclose a bubble level that includes a pair of first laser emitters and a pair of clamps that are attachable to the level which each can engage an object for mounting the level to the object and a plurality of second laser emitters integrated into a respective one of the clamps.

BRIEF SUMMARY OF THE INVENTION

An embodiment of the disclosure meets the needs presented above by generally comprising a level to indicate level along a variety of planes for a worker. A pair of first laser emitters is integrated into opposing ends of the level to emit a focused beam of light outwardly from the level onto a surface. A pair of clamps is provided which each has a first gripping element and a second gripping element. The first gripping element associated with each of the pair of clamps receives the level for attaching the pair of clamps to the level to receive a support object thereby facilitating the level to be affixed to the support object. A pair of second laser emitters is each integrated into a respective one of the pair of clamps to emit a focused beam of light outwardly from the respective clamp onto the surface for assisting the worker with visually identifying a level mark on the surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is a perspective in-use view of an embodiment of the disclosure.

DETAILED DESCRIPTION OF THE INVENTION

Figure 1:
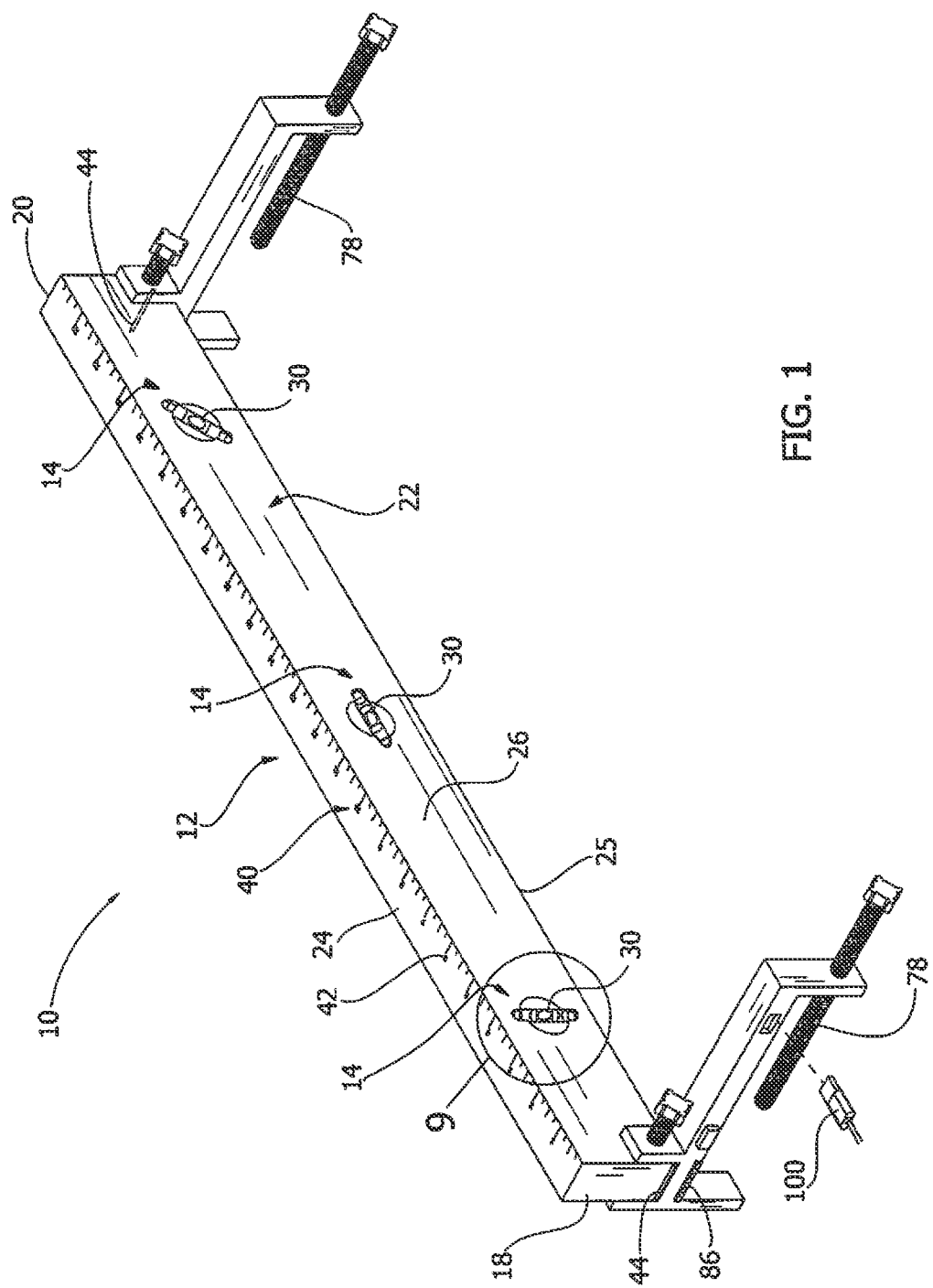
FIG. 1 is a front perspective view of a laser leveling assembly according to an embodiment of the disclosure.
Figure 2:
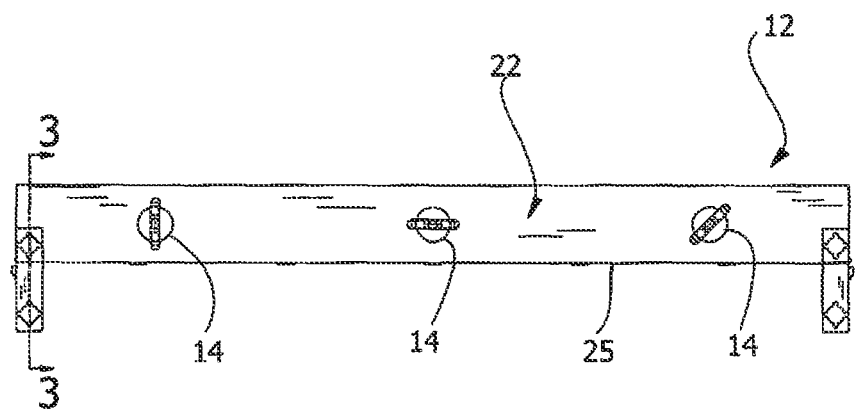
FIG. 2 is a front view of an embodiment of the disclosure.
Figure 3:
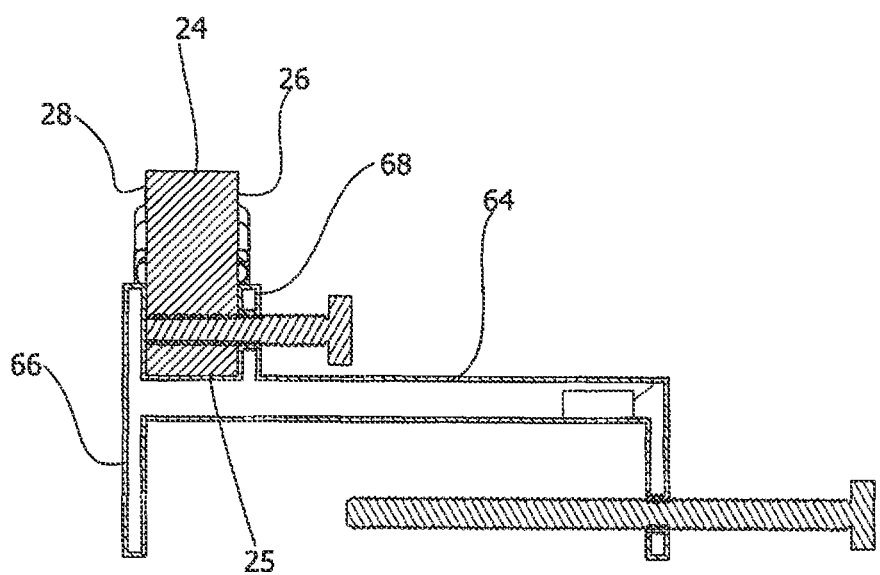
FIG. 3 is a cross sectional view taken along line 3-3 of FIG. 2 of an embodiment of the disclosure.
Figure 4:
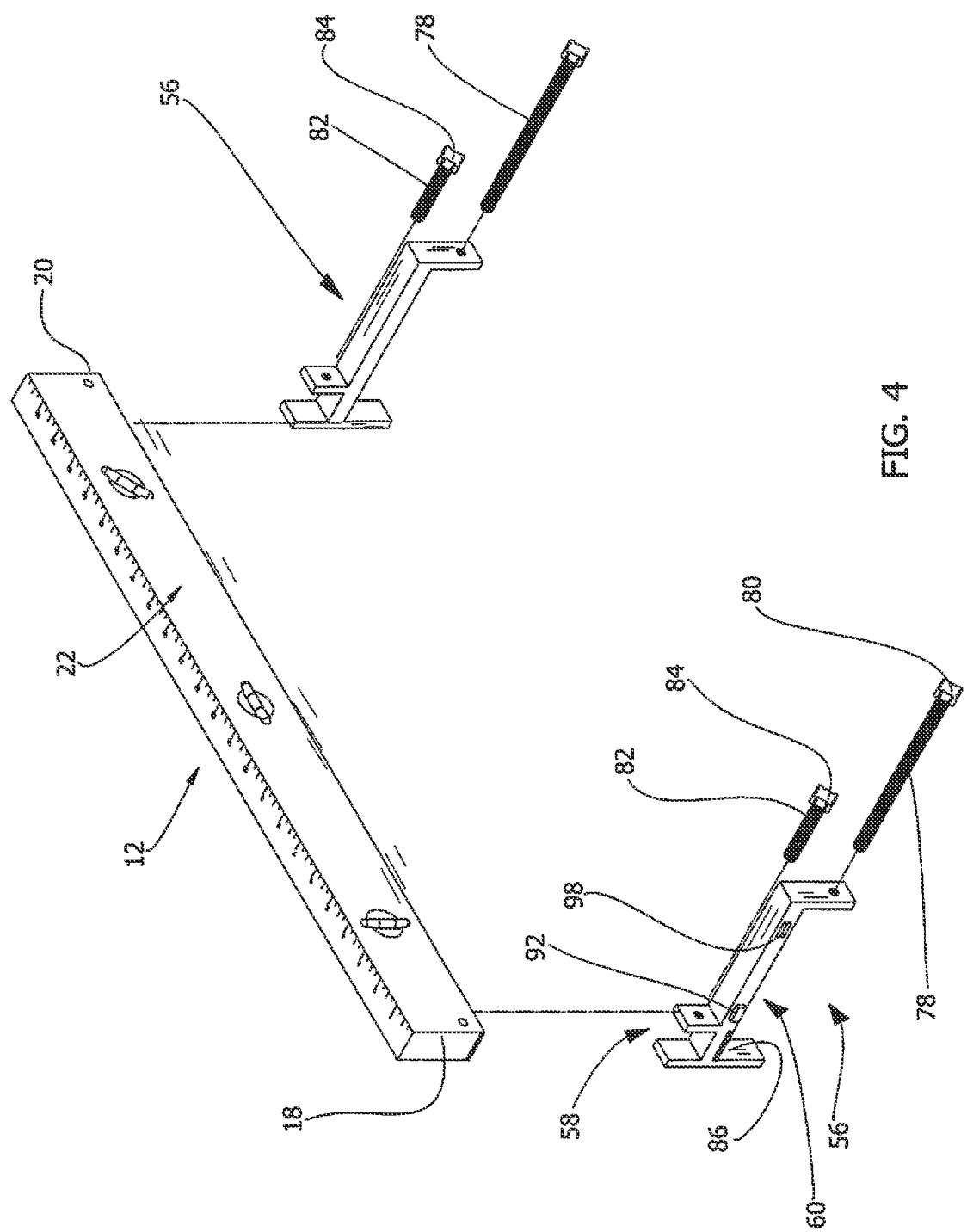
FIG. 4 is an exploded perspective view of an embodiment of the disclosure.
Figure 7:
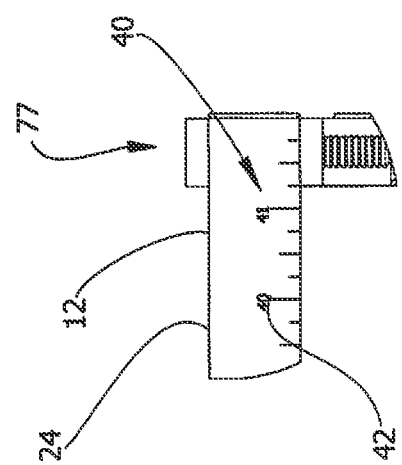
FIG. 7 is a perspective view of an alternative embodiment of the disclosure.
Figure 6:
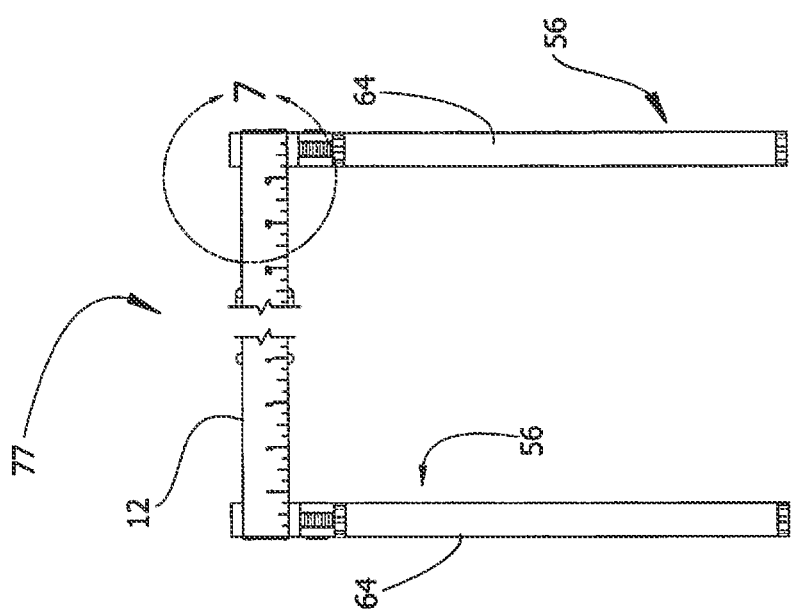
FIG. 6 is a top view of an alternative embodiment of the disclosure.
Figure 8:
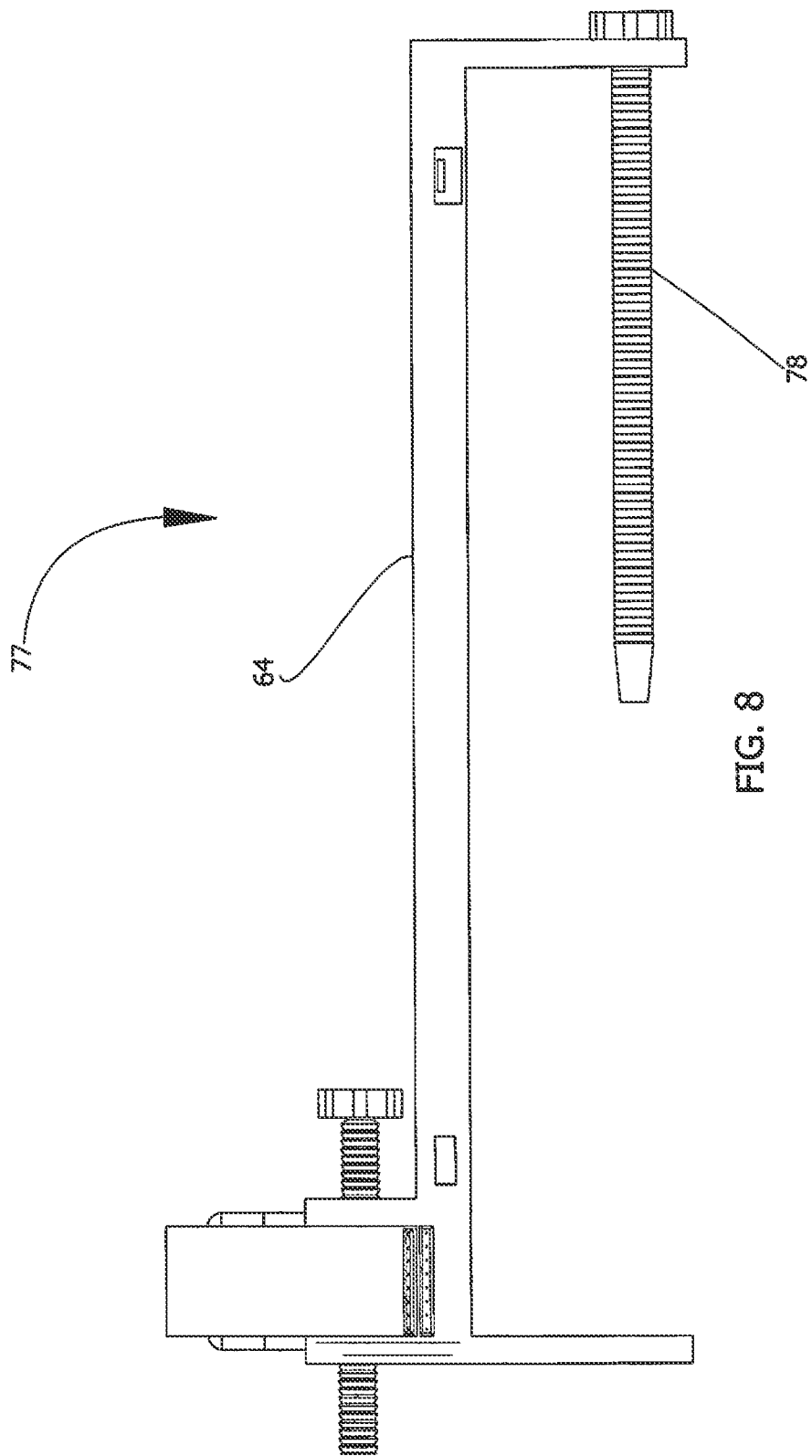
FIG. 8 is a right side view of an alternative embodiment of the disclosure.
Figure 9:
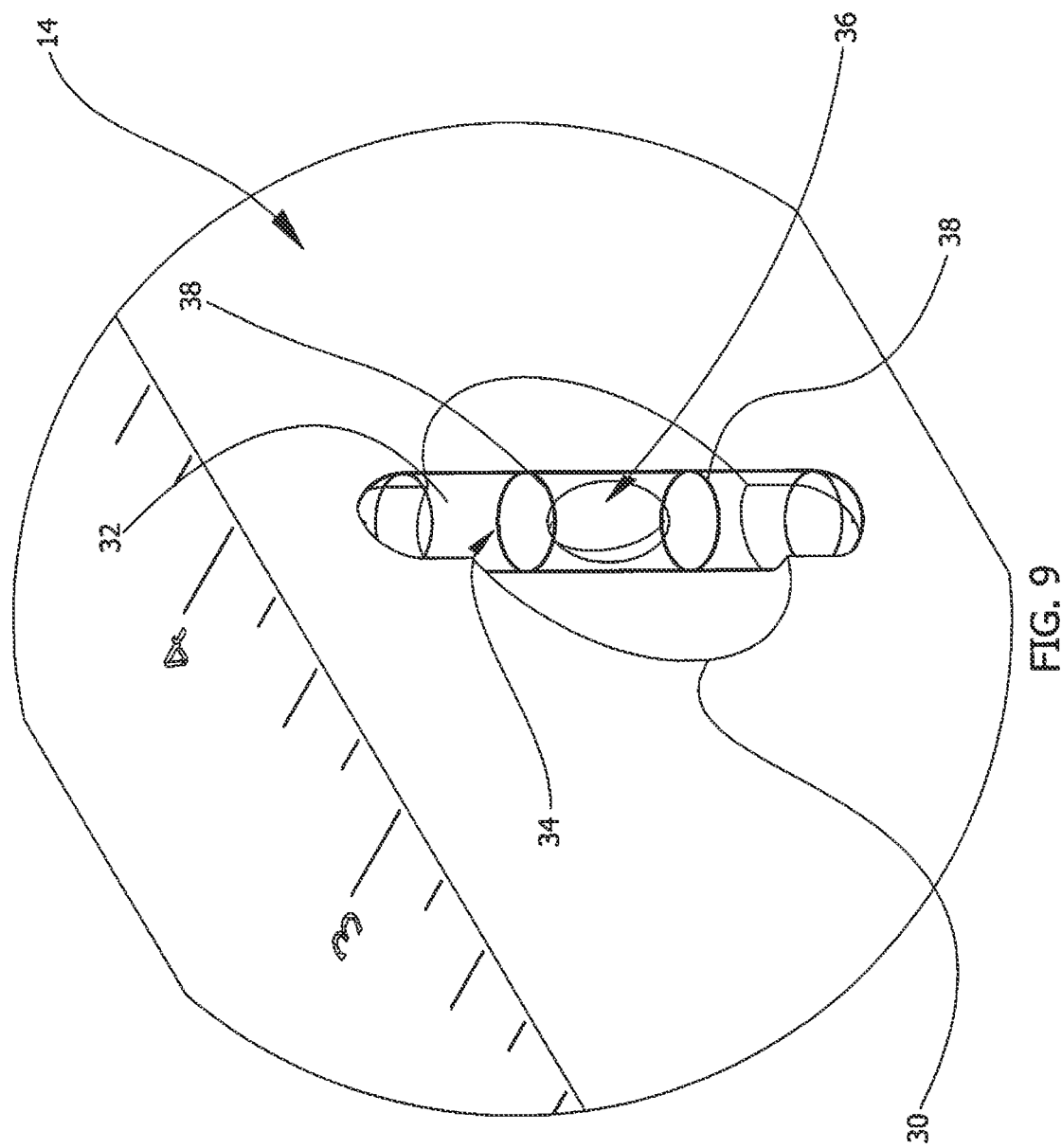
FIG. 9 is a magnified detail view taken from circle 9 of FIG. 1 of an embodiment of the disclosure.
Figure 10:
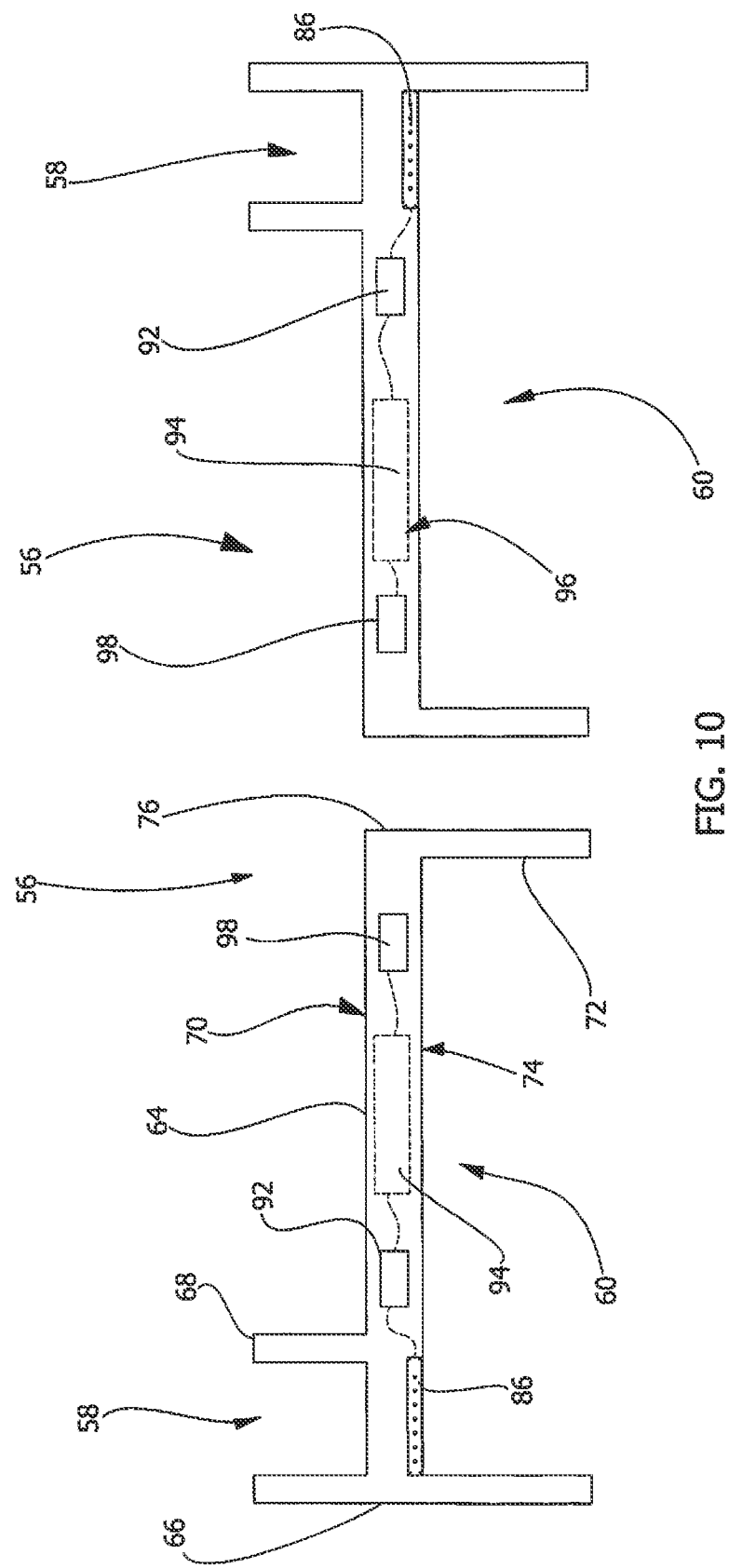
FIG. 10 is a perspective view of a pair of clamps of an embodiment of the disclosure.
Figure 11:
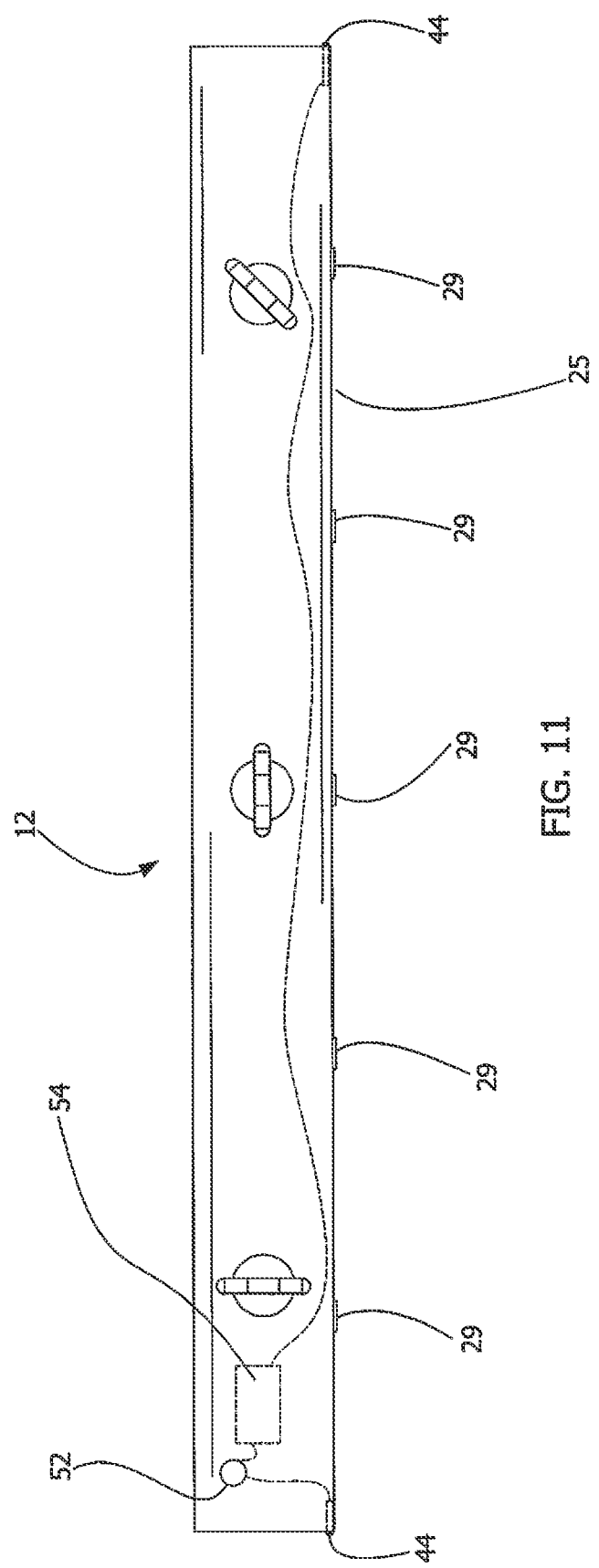
FIG. 11 is a front phantom view of a level of an embodiment of the disclosure.
Figure 12:
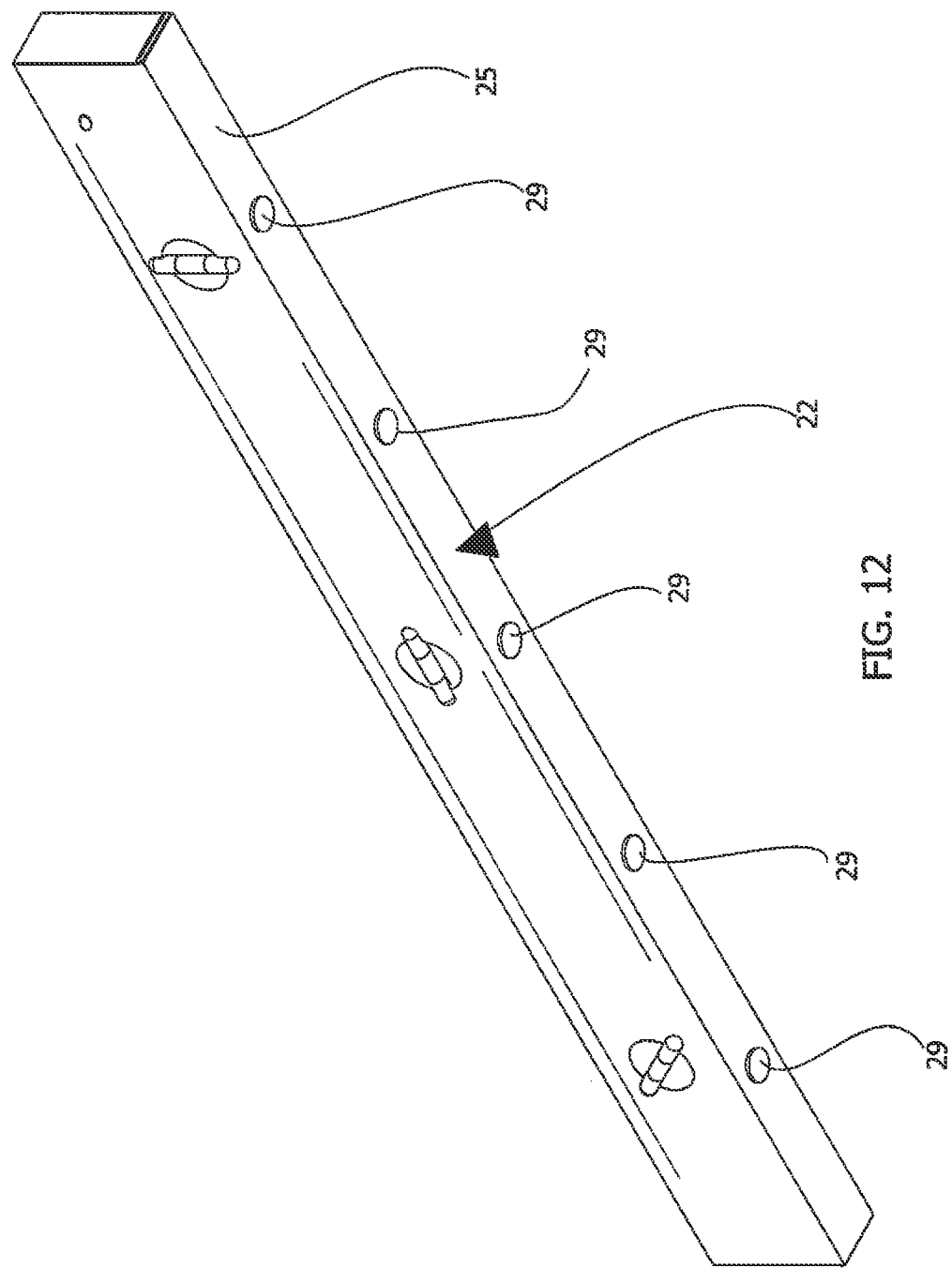
FIG. 12 is a bottom perspective view of a level of an embodiment of the disclosure.

With reference now to the drawings, and in particular to FIGS. 1 through 12 thereof, a new leveling device embodying the principles and concepts of an embodiment of the disclosure and generally designated by the reference numeral 10 will be described.

As best illustrated in FIGS. 1 through 12, the laser leveling assembly 10 generally comprises a level 12 has a plurality of bubble levels 14 each oriented at a unique angle with respect to each other to indicate level 12 along a variety of planes for a worker 16. The level 12 has a first end 18, a second end 20 and an outer surface 22 extending between the first end 18 and the second end 20 and the outer surface 22 has a top side 24, a bottom side 25, a front side 26 and a back side 28. The level 12 has a plurality of holes 30 each extending through the front side 26 and the back side 28. The holes 30 are evenly spaced apart from each other and are distributed between the first end 18 and the second end 20. A plurality of magnets 29 is attached to the bottom side 25 of the outer surface 22 of the level and the magnets 29 are spaced apart from each other and are evenly distributed between the first end 18 and the second end 20 of the level 12. Each of the magnets 29 magnetically engages a ferromagnetic support surface 31 for retaining the level 12 on the ferromagnetic support surface 31.

Each of the bubble levels 14 is installed in a respective one of the holes 30. Each of the bubble levels 14 includes a tube 32 that is partially filled with a fluid 34 to define a bubble 36 in each of the bubble levels 14. Each of the bubble levels 14 has a pair of lines 38 each being offset from a center of the bubble level 12 to facilitate the bubble 36 to be compared to the lines 38 to establish level. Each of the plurality of bubble levels 14 is oriented such that the tube 32 in each of the bubble levels 14 extends along a respective one of a horizontal axis, a vertical axis and a diagonal axis with respect to the level 12. Indicia 40 are applied to the top side 24 of the outer surface 22 and the indicia 40 comprise a graduated scale 42 for measuring length. Additionally, the level 12 may be manufactured in a pair of different lengths of approximately 61.0 or 122.0 cm.

A pair of first laser emitters 44 is each integrated into opposing ends of the level 12 to emit a focused beam of light 46 outwardly from the level 12 onto a surface 48 for assisting a worker 16 with visually identifying a level mark on the surface 48. Each of the first laser emitters 44 is aligned with an intersection between the bottom side 25 of the outer surface 22 of the level 12 and a respective one of the first end 18 and the second end 20. Furthermore, each of the first laser emitters 44 may comprise a light emitting diode or other type of focused beam light emitter of either a Class II or Class IIIa device, as defined by United States Food and Drug Administration regulations, having a power output of less than 5.0 milliwatts. A first power button 52 is movably integrated into the level 12 and the first power button 52 is electrically coupled to each of the pair of first laser emitters 44 for turning the pair of first laser emitters 44 on and off. A first power supply 54 is removably integrated into the level 12, the first power supply 54 is electrically coupled to the first power button 52 and the first power supply 54 comprises at least one battery.

A pair of clamps 56 is provided and each of the clamps 56 has a first gripping element 58 and a second gripping element 60. The first gripping element 58 associated with each of the pair of clamps 56 receives the level 12 for attaching the pair of clamps 56 to the level 12. In this way the second gripping element 60 of each of the clamps 56 can receive a support object 62 thereby facilitating the level 12 to be affixed to the support object 62. The support object 62 may be an article of furniture, a framing member or any type of stationary object located in a work area for the worker 16. Furthermore, the worker 16 may be a construction worker, a homeowner or any other person that is performing a task the requires objects to be leveled when being installed or serviced.

Each the pair of clamps 56 comprises a first member 64 that is coupled to and is perpendicularly oriented with a second member 66 such that the second member 66 is oriented transverse with the first member 64. A first tab 68 is coupled to and extends upwardly from a top surface 70 of the first member 64 and the first tab 68 lies on a plane that is oriented parallel to the second member 66. The first tab 68 is spaced a pre-determined distance from the second member 66 such that the first tab 68 and the second member 66 define the first gripping element 58. The level 12 is positionable between the first tab 68 and the second member 66 having the bottom side 50 of the outer surface 22 of the level 12 resting on the top surface 70 of the first member 64 and having each of the second member 66 and the first tab 68 facing a respective one of the front side 26 and the back side 28 of the outer surface 22 of the level 12.

Each of the pair of clamps 56 includes a second tab 72 that is coupled to and extends downwardly from a bottom surface 74 of the first member 64. The second tab 72 lies on a plane that is oriented parallel to the second member 66 and the second tab 72 is aligned with a distal end 76 of the first member 64 with respect to the second member 66 such that each of the second tab 72 and the second member 66 define the second gripping element 60. The first member associated with each of the clamps may have a length of approximately 15.0 cm. In an alternative embodiment 77 as is most clearly shown in FIGS. 6 through 8, the first member 64 associated with each of the clamps 56 may have a length of approximately 30.0 cm and A first screw 78 extends through the first tab 68 and the first screw 78 has a head 80 which can be gripped for rotating the first screw 78. The first screw 78 compresses against the level 12 when the level 12 is positioned in the first gripping element 58 and the first screw 78 is tightened for retaining the level 12 in the first gripping element 58. A second screw 82 extends through the second tab 72 and the second screw 82 has a head 84 that can be gripped for rotating the second screw 82. The second screw 82 extends toward the second member 66 when the second screw 82 is tightened to compress the support object 84 between the second screw 82 and the second member 66 for retaining the support object 84 in the second gripping element 60. The first screw 78 may have a length of approximately 7.5 cm. In the alternative embodiment 77 shown in FIGS. 6 through 8 the first screw 78 may have a length of approximately 15.0 cm A pair of second laser emitters 86 is each integrated into a respective one of the pair of clamps 56 to emit a focused beam of light 46 outwardly from the respective clamp 56 onto the surface 48 for assisting the worker 16 with visually identifying a level mark on the surface 48. Each of the second laser emitters 86 is positioned on a first lateral surface 90 of the first member 64 associated with the respective clamp 56 and each of the second laser emitters 86 is aligned with the second member 66 of associated with the respective clamp 56. Furthermore, each of the second laser emitters 86 may comprise a light emitting diode or other type of focused beam light emitter of either a Class II or Class IIIa device, as defined by United States Food and Drug Administration regulations, having a power output of less than 5.0 milliwatts.

A pair of second power buttons 92 is each movably integrated into the first lateral surface 90 of the first member 64 of a respective one of the pair of clamps 56. Each of the pair of second power buttons 92 is electrically coupled to the second laser emitter 86 in the respective clamp 56 for turning the second laser emitter 86 in the respective clamp 56 on and off. A pair of second power supplies 94 is each integrated into the first member 64 of a respective one of the clamps 56. Each of the second power supplies 94 is electrically coupled to the second laser emitter integrated 86 into the respective clamp 56.

Each of the second power supplies 94 comprises a rechargeable battery 96 that is integrated into the respective clamp 56. The rechargeable battery 96 is electrically coupled to the second power button 92 associated with the respective clamp 56. Each of the second power supplies 94 includes a charge port 98 that is recessed into the first lateral surface 90 of the first member 64 associated with the respective clamp 56 thereby facilitating the charge port 98 to receive a charge cord 100. Additionally, the charge port 98 is electrically coupled to the rechargeable battery 96 for recharging the rechargeable battery 96. The charge port 98 associated with each of the second power supplies 94 may comprise a universal serial bus port or other similar type of charge port commonly found on personal electronic devices.

In use, the level 12 can be employed independently of the pair of clamps 56 for establishing level for a variety of purposes. Each of the pair of clamps 56 can be attached to the level 12 thereby facilitating each of the pair of clamps 56 to secure the level 12 to the support object 62. In this way either of the first laser emitters 44 or the second laser emitters 86 can be turned on to produce a reference line on a nearby surface 48 for leveling an object, such as a suspended ceiling framework for example, that is being installed on the surface 48. Furthermore, the pair of clamps 56 facilitates a single worker to establish a reference line for level 12 without assistance from an additional worker. In this way the worker 16 is enabled to work more efficiently and to precisely accomplish installations while working solo.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A laser leveling assembly for assisting a worker with leveling an object during installation, said assembly comprising:
    a level having a plurality of bubble levels each oriented at a unique angle with respect to each other wherein said level is configured to indicate level along a variety of planes for a worker;
    a pair of first laser emitters, each of said first laser emitters being integrated into opposing ends of said level wherein each of said first laser emitters is configured to emit a focused beam of light outwardly from said level onto a surface for assisting a worker with visually identifying a level mark on the surface;
    a pair of clamps, each of said clamps having a first gripping element and a second gripping element, said first gripping element associated with each of said pair of clamps receiving said level for attaching said pair of clamps to said level wherein said second gripping element of each of said clamps is configured to receive a support object thereby facilitating said level to be affixed to the support object; and
    a pair of second laser emitters, each of said second laser emitters being integrated into a respective one of said pair of clamps wherein each of said second laser emitters is configured to emit a focused beam of light outwardly from said respective clamp onto the surface for assisting the worker with visually identifying a level mark on the surface.

2. The assembly according to claim 1, wherein:
    said level has a first end, a second end and an outer surface extending between said first end and said second end;
    said outer surface has a top side, a front side and a back side;
    said level has a plurality of holes each extending through said front side and said back side, said holes being evenly spaced apart from each other and being distributed between said first end and said second end;
    each of said bubble levels is installed in a respective one of said holes, each of said bubble levels including a tube being partially filled with a fluid to define a bubble in each of said bubble levels, each of said bubble levels having a pair of lines each being offset from a center of said bubble level, each of said plurality of bubble levels being oriented such that said tube in each of said bubble levels extends along a respective one of a horizontal axis and a vertical axis and a diagonal axis with respect to said level;
    said level has indicia being applied to said top side of said outer surface, said indicia comprising a graduated scale for measuring length; and
    each of said first laser emitters is aligned with an intersection between a bottom side of said outer surface of said level and a respective one of said first end and said second end.

3. The assembly according to claim 2, wherein each said pair of clamps comprises:
    a first member being coupled to and being perpendicularly oriented with a second member such that said second member is oriented transverse with said first member; and
    a first tab being coupled to and extending upwardly from a top surface of said first member, said first tab lying on a plane being oriented parallel to said second member, said first tab being spaced a pre-determined distance from said second member such that said first tab and said second member define said first gripping element, said level being positionable between said first tab and said second member having said bottom side of said outer surface of said level resting on said top surface of said first member and having each of said second member and said first tab facing a respective one of said front side and said back side of said outer surface of said level.

4. The assembly according to claim 3, wherein each of said pair of clamps includes a second tab being coupled to and extending downwardly from a bottom surface of said first member, said second tab lying on a plane being oriented parallel to said second member, said second tab being aligned with a distal end of said first member with respect to said second member such that each of said second tab and said second member define said second gripping element.

5. The assembly according to claim 4, wherein each of said pair of clamps includes:
a first screw extending through said first tab; and
a second screw extending through said second tab, said second screw having a head being configured to be gripped for rotating said second screw, said second screw extending toward said second member when said second screw is tightened wherein said second screw is configured to compress the support object between said second screw and said second member for retaining the support object in said second gripping element.

6. The assembly according to claim 3, wherein each of said pair of clamps includes a first screw extending through said first tab, said first screw having a head being configured to be gripped for rotating said first screw, said first screw compressing against said level when said level is positioned in said first gripping element and said first screw is tightened for retaining said level in said first gripping element.

7. The assembly according to claim 2, wherein each of said second laser emitters is positioned on a first lateral surface of said first member associated with said respective clamp, each of said second laser emitters being aligned with said second member of associated with said respective clamp.

8. The assembly according to claim 2, further comprising:
a first power button being movably integrated into said level;
a first power supply being integrated into said level;
a pair of second power buttons, each of said second power buttons being movably integrated into said first lateral surface of said first member of a respective one of said pair of clamps, each of said pair of second power buttons being electrically coupled to said second laser light emitter in said respective clamp for turning said second laser light emitter in said respective clamp on and off; and
a pair of second power supplies, each of said second power supplies being integrated into said first member of a respective one of said clamps, each of said second power supplies being electrically coupled to said second light emitter integrated into said respective clamp, each of said second power supplies comprising:
a rechargeable battery being integrated into said respective clamp, said rechargeable battery being electrically coupled to said second power button associated with said respective clamp; and
a charge port being recessed into said first lateral surface of said first member associated with said respective clamp thereby facilitating said charge port to receive a charge cord, said charge port being electrically coupled to said rechargeable battery for recharging said rechargeable battery.

9. The assembly according to claim 1, further comprising:
a first power button being movably integrated into said level, said first power button being electrically coupled to each of said pair of first laser emitters for turning said pair of first laser emitters on and off; and
a first power supply being removably integrated into said level, said first power supply being electrically coupled to said first power button, said first power supply comprising at least one battery.

10. A laser leveling assembly for assisting a worker with leveling an object during installation, said assembly comprising:

a level having a plurality of bubble levels each oriented at a unique angle with respect to each other wherein said level is configured to indicate level along a variety of planes for a worker, said level having a first end, a second end and an outer surface extending between said first end and said second end, said outer surface having a top side, a front side and a back side, said level having a plurality of holes each extending through said front side and said back side, said holes being evenly spaced apart from each other and being distributed between said first end and said second end, each of said bubble levels being installed in a respective one of said holes, each of said bubble levels including a tube being partially filled with a fluid to define a bubble in each of said bubble levels, each of said bubble levels having a pair of lines each being offset from a center of said bubble level, each of said plurality of bubble levels being oriented such that said tube in each of said bubble levels extends along a respective one of a horizontal axis and a vertical axis and a diagonal axis with respect to said level, said level having indicia being applied to said top side of said outer surface, said indicia comprising a graduated scale for measuring length;
a pair of first laser emitters, each of said first laser emitters being integrated into opposing ends of said level wherein each of said first laser emitters is configured to emit a focused beam of light outwardly from said level onto a surface for assisting a worker with visually identifying a level mark on the surface, each of said first laser emitters being aligned with an intersection between a bottom side of said outer surface of said level and a respective one of said first end and said second end;
a first power button being movably integrated into said level, said first power button being electrically coupled to each of said pair of first laser emitters for turning said pair of first laser emitters on and off;
a first power supply being removably integrated into said level, said first power supply being electrically coupled to said first power button, said first power supply comprising at least one battery;
a pair of clamps, each of said clamps having a first gripping element and a second gripping element, said first gripping element associated with each of said pair of clamps receiving said level for attaching said pair of clamps to said level wherein said second gripping element of each of said clamps is configured to receive a support object thereby facilitating said level to be affixed to the support object, each said pair of clamps comprising:
a first member being coupled to and being perpendicularly oriented with a second member such that said second member is oriented transverse with said first member;
a first tab being coupled to and extending upwardly from a top surface of said first member, said first tab lying on a plane being oriented parallel to said second member, said first tab being spaced a predetermined distance from said second member such that said first tab and said second member define said first gripping element, said level being positionable between said first tab and said second member having said bottom side of said outer surface of said level resting on said top surface of said first member and having each of said second member and said first tab facing a respective one of said front side and said back side of said outer surface of said level;

a second tab being coupled to and extending downwardly from a bottom surface of said first member, said second tab lying on a plane being oriented parallel to said second member, said second tab being aligned with a distal end of said first member with respect to said second member such that each of said second tab and said second member define said second gripping element;

a first screw extending through said first tab, said first screw having a head being configured to be gripped for rotating said first screw, said first screw compressing against said level when said level is positioned in said first gripping element and said first screw is tightened for retaining said level in said first gripping element; and a second screw extending through said second tab, said second screw having a head being configured to be gripped for rotating said second screw, said second screw extending toward said second member when said second screw is tightened wherein said second screw is configured to compress the support object between said second screw and said second member for retaining the support object in said second gripping element;

a pair of second laser emitters, each of said second laser emitters being integrated into a respective one of said pair of clamps wherein each of said second laser emitters is configured to emit a focused beam of light outwardly from said respective clamp onto the surface for assisting the worker with visually identifying a level mark on the surface, each of said second laser emitters being positioned on a first lateral surface of said first member associated with said respective clamp, each of said second laser emitters being aligned with said second member of associated with said respective clamp;

a pair of second power buttons, each of said second power buttons being movably integrated into said first lateral surface of said first member of a respective one of said pair of clamps, each of said pair of second power buttons being electrically coupled to said second laser light emitter in said respective clamp for turning said second laser light emitter in said respective clamp on and off; and a pair of second power supplies, each of said second power supplies being integrated into said first member of a respective one of said clamps, each of said second power supplies being electrically coupled to said second light emitter integrated into said respective clamp, each of said second power supplies comprising:

a rechargeable battery being integrated into said respective clamp, said rechargeable battery being electrically coupled to said second power button associated with said respective clamp; and a charge port being recessed into said first lateral surface of said first member associated with said respective clamp thereby facilitating said charge port to receive a charge cord, said charge port being electrically coupled to said rechargeable battery for recharging said rechargeable battery.

* * * * *